United States Patent

[11] 3,589,078

| [72] | Inventors | John L. Bala<br>Sudbury;<br>Ronald Aspden, Bedford; Peter W. Ford, Woburn, all of, Mass. |
|---|---|---|
| [21] | Appl. No. | 747,887 |
| [22] | Filed | July 26, 1968 |
| [45] | Patented | June 29, 1971 |
| [73] | Assignee | Itek Corporation<br>Lexington, Mass. |

[54] SURFACE GENERATING APPARATUS
48 Claims, 11 Drawing Figs.

[52] U.S. Cl. .................................................. 51/165,
51/54, 51/240, 51/284
[51] Int. Cl. ............................................. B24b 49/00
[50] Field of Search ........................................... 51/165, 54, 56, 240, 284

[56] References Cited
UNITED STATES PATENTS

| 1,751,931 | 3/1930 | Legge ............................ | 51/56 |
| 1,777,726 | 10/1930 | Inwald et al. ................. | 51/56 |
| 2,799,975 | 7/1957 | Ashenfelder et al. .......... | 51/165 X |

*Primary Examiner*—Lester M. Swingle
*Attorneys*—Homer O. Blair, Robert L. Nathans, Lester S. Grodberg and John E. Toupal

ABSTRACT: An apparatus for producing relative movement between a work surface and a surface modifying mechanism in two independently controllable component directions. An energizing circuit generates a predetermined path of relative movement in response to objective data input. By independently varying the velocity magnitudes of the components of relative movement, the energizing circuit insures the generation of a smooth travel path that is desirable for high quality surfaces.

Fig. 1.

Inventors:
John L. Bain,
Ronald Aspden,
Peter W. Ford,
by John C. Toupal Attorney

SURFACE GENERATING APPARATUS

BACKGROUND OF THE INVENTION

This invention relates generally to an apparatus for generating optical surfaces. More particularly, the invention relates to an apparatus especially suited for correcting asymmetrical imperfections in the surfaces of optical blanks.

According to known methods, optical surfaces are ground and polished by utilizing completely empirically developed techniques. The practice of optical surface generation in accordance with these techniques suffers from a number of significant disadvantages including requirements for lengthy processing and for highly skilled technicians. Furthermore, since most empirically developed techniques are designed to produce symmetrical alteration of optical surfaces, they are generally inappropriate for eliminating asymmetrical deviations from a desired surface contour. This latter deficiency is particularly troublesome with regard to relatively large optical surfaces of, for example, 50-inch diameter and larger in which rotational asymmetries and random irregularities are more prominent than in smaller surfaces.

A significant improvement over previously known optical surface generation methods and systems is disclosed in copending, commonly assigned U.S. Pat. application Ser. No. 719,657 of Ronald Aspden, entitled "Optical Surface Generating Method" and filed Apr. 8, 1968. According to that invention, an optical blank work surface is figuratively divided into an array of adjoining surface areas and measured to determine the total relative number of uniform blank material decrements that are required in each surface area to produce a desired surface contour. An optical lap moving in an irregular path produces a uniform decrement upon each traversal across an individual surface area. Movement of the lap is precisely controlled such that its travel path exhibits a preference for movement from an occupied area to adjacent areas still requiring the greatest number of material decrements. In this way, rotational asymmetries and random irregularities in the work surface can be accurately and predictably corrected.

Although the above-described method of optical surface generation offers substantial improvements over prior systems, certain problems still exist. Most of these problems are related to the equipment required for producing two dimensions of relative movement between the lap and the work surface. For example, conventional machines of the x-y table-type are mechanically unsuitable because of the relatively large sizes and weights of the laps utilized. Furthermore, use of conventional x-y control techniques to produce lap movement to predetermined coordinate objectives on the blank's work surface results in abrupt direction changes that seriously reduce the quality of the surface produced.

The object of this invention, therefore, is to provide an improved surface generating system that is capable of producing high quality optical surfaces in a highly accurate and predictable manner.

CHARACTERIZATION OF THE INVENTION

The invention is characterized by the provision of an optical surface generating system having a support for an optical blank, a surface modifying means for altering the surface contour of a supported blank's work surface, a drive mechanism for producing between the work surface and the surface modifying means relative transverse movement in two independently controllable component directions, a data source for providing objective data representing a desired path of relative movement between the work surface and the surface modifying means, and an energizing circuit responsive to the objective data and adapted to selectively energize the drive mechanism so as to produce the desired path of relative movement, and wherein the energizing circuit is adapted to independently vary the velocity magnitudes of said components of relative movement so as to generate curved portions of substantial length in the path of relative movement produced between the surface modifying means and the optical blank's work surface. According to this system, work surface corrections can be achieved in a highly predictable manner. Furthermore, the independent variation of velocity magnitudes produces a smooth path of relative movement between the surface modifying means and the work surface thereby promoting a finished surface of high optical quality.

One feature of the invention is the provision of an optical surface generating system of the above type wherein the energizing circuit varies the velocity magnitudes by producing predetermined periods of deceleration in the components of relative movement. The use of predetermined and nonsynchronized periods of deceleration in the components of relative movement generates, in a highly efficient manner, the desired smooth path of travel between the surface modifying means and the work surface.

Another feature of the invention is the provision of an optical surface generating system of the above featured type wherein the energizing circuit also varies the velocity magnitudes by producing predetermined nonsynchronized periods of acceleration in the components of relative movement.

Another feature of the invention is the provision of an optical surface generating system of the above featured type wherein the data source sequentially provides objective data representing a plurality of predetermined relative positions between the work surface and the surface modifying means, the relative positions being identified by coordinate objectives in each of the component directions, and the energizing circuit responds to the objective data by producing the components of relative movement in senses suitable to establish the coordinate objectives but of magnitudes that result in predetermined overshoots of the identified coordinate objectives. The desired smooth path of relative movement is obtained in this embodiment with circuitry of minimal cost and complexity.

Another feature of the invention is the provision of an optical surface generating system of the above featured type wherein the surface modifying means is an optical lap mounted for movement across the work surface of the optical blank. Movement of the lap across the blank's work surface in a predetermined path decrements blank material in selective relative volumes necessary to produce the desired surface contour.

Another feature of this invention is the provision of an optical surface generating system of the above type wherein the drive mechanism includes a first drive motor for producing movement of the optical lap in one of the component directions and a second drive motor for producing movement of the lap in the other component direction orthogonally related to the first. The use of orthogonally related optical lap movements facilitates the identification of the lap travel path in accordance with desirable Cartesian coordinates.

Another feature of this invention is the provision of an optical surface generating system of the above featured type wherein the energizing circuit includes indicators that produce position data representing the relative position existing between the work surface and the optical lap, the position data identifying the existing relative position in terms of coordinate values in each of the component directions. The energizing circuit calls for a new coordinate objective from the data source in response to reception of position data indicating that a current coordinate objective has been reached.

Another feature of the invention is the provision of an optical surface generating system of the above featured types wherein the energizing circuit decelerates the first drive motor during overshoots in the one component direction in response to reception of objective data representing a coordinate objective that requires a sense reversal in the one component direction of relative movement, and decelerates the second drive motor during overshoots in the other component direction in response to reception of objective data representing a coordinate objective that requires a sense reversal in the other component direction of relative movement. Deceleration of the drive motors during overshoot periods prior to reversals in the direction of lap movement produces a smoothing effect on the lap travel path and reduces the mechanical problems associated with direction reversals of relatively large, heavy laps.

Another feature of the invention is the provision of an optical surface generating system of the above-featured types wherein the energizing circuit compares the objective data received from the data source with the position data received from the position indicators and produces a first substantially square wave output signal during periods wherein differences exist with respect to the one component direction and a second square wave output signal during periods wherein differences exist with respect to the other component directions. These square wave signals are applied to integrator circuits that produce integrated output signals for energizing the first and second drive motors. By integrating square wave output signals, the desired decelerated overshoots in the two component directions of movement are produced in a simple, efficient manner.

Another feature of the invention is the provision of an optical surface generating system of the above-featured types wherein the energizing circuit energizes the first drive motor at a substantially uniform level during overshoots in the one component direction in response to reception of objective data representing a coordinate objective that does not require a sense reversal in the one component direction of relative movement, energizes the second drive motor at a substantially uniform level during overshoots in the other component direction in response to reception of objective data representing a coordinate objective that does not require a sense reversal in the other component direction of relative movement. According to this feature, unnecessary deceleration of the drive motors is eliminated during overshoots preceding component movements having the same sense as the previous move.

Another feature of the invention is the provision of an optical surface generating system of the above types wherein the optical lap is supported by a carriage movable in the independently controllable component directions on a system frame and the blank support is a transport table which can be adjustably positioned with respect to the frame and is independently mobile and detachable therefrom. The detachable and independently mobile transport table enhances the system's flexibility by simplifying blank handling requirements. For example, without being disturbed with respect to the transport table, a blank can be removed from the system and transported to a remote location for convenient remeasurement of its work surface. Subsequently the blank still supported on the transport table, again can be positioned precisely in the surface generating machine and the polishing operation resumed.

This feature is particularly important with regard to relatively thin, large diameter blanks which are highly susceptible to undesirable deformation by physical stresses induced during a lifting operation. The mobile transport table also improves efficiency by facilitating continuous use of the polishing equipment. For example, a single machine can be involved in a plurality of current polishing operations. Upon removal of one transport table mounted blank for a required work surface remeasurement, another transport table mounted blank can be promptly positioned and a suitably reprogrammed surface generating operation resumed.

Another feature of the invention is the provision of an optical surface generating system of the above-featured type including a limit control mechanism that automatically limits movement of the lap supporting carriage to a given distance in any radial direction about a predetermined position. By equating the given limit distance to the radius of the blank surface being worked, inadvertent movement of the lap off of the blank's work surface is prevented. A preferred embodiment of this feature comprises a flexible cord having one end secured to the carriage and adapted to actuate a switch upon movement of the carriage over the given distance. According to this embodiment, the limit control can be made to accommodate an optical blank of any radius by merely changing the length of the flexible cord.

Another feature of the invention is the provision of an optical surface generating system of the above-featured types wherein the system frame comprises a first pair of parallel guide rails supported for movement on a second pair of parallel guide rails orthogonally related to the first pair and wherein the lap carriage is supported for movement from at least two positions on one of the first pair of guide rails and from only one position on the other of the first pair of guide rails. Three point support of the lap carriage prevents binding of the carriage during movement on the first pair of guide rails. This is particularly important in a system specifically suited for large diameter blanks because of the mechanical stresses induced during movement of the relatively large and heavy laps required. Such stresses can produce longitudinal deformation of the parallel rails. In addition, this feature diminishes cost of the equipment by reducing required production tolerances.

Another feature of the invention is the provision of an optical surface generating system of the above-featured types wherein the objective data is provided in digital form, the first and second drive motors are electrical pulse driven motors and the energizing circuit includes pulse generators for producing motor drive pulses. A digital information system and pulse driven motors are especially well suited for use in the described surface generating system.

These and other characteristics and features of the present invention will become more apparent upon a perusal of the following specification taken in conjunction with the accompanying drawings wherein:

FIG. 7 is a block diagram of the $x$-motor control system shown in FIG. 6;

Figure 1:
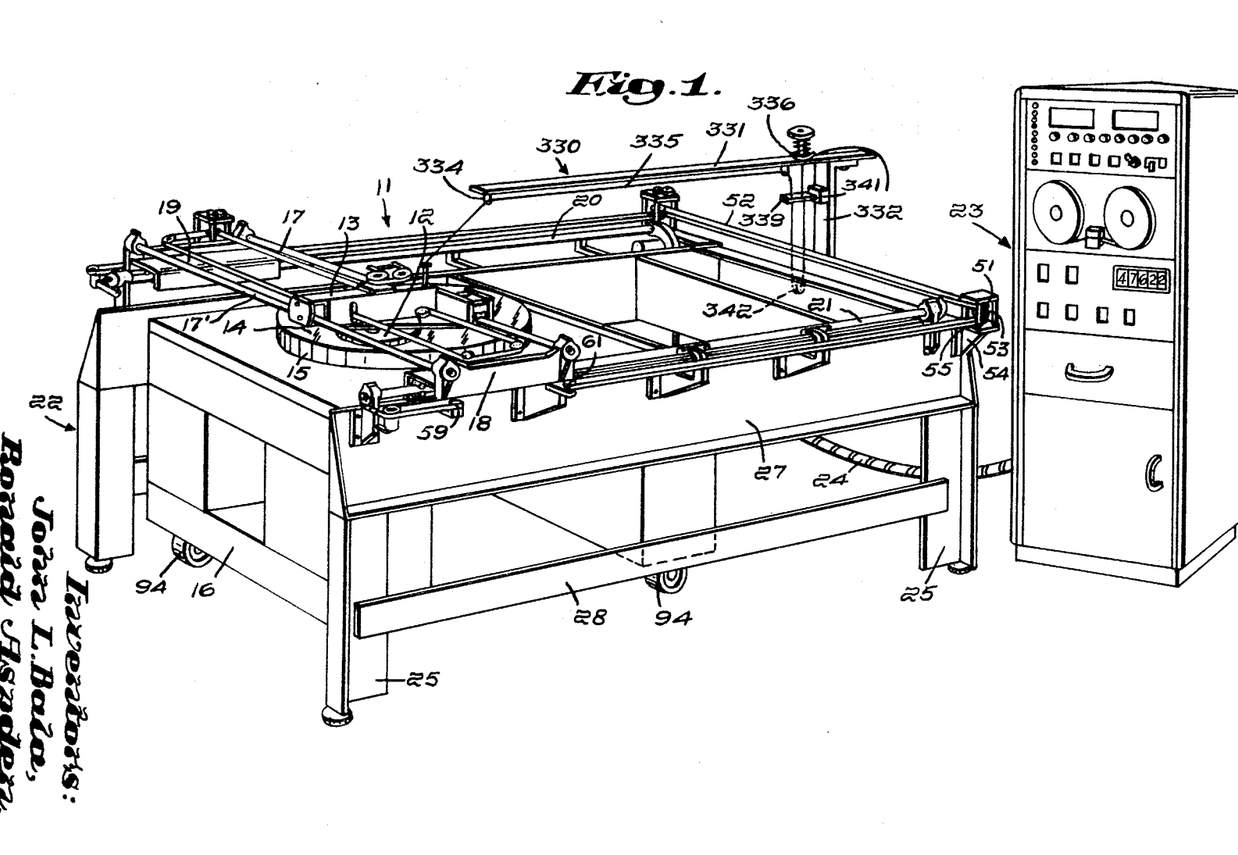
FIG. 1 is a general perspective view of a preferred surface generating system embodiment of the invention.

Referring now to FIG. 1 there is shown the optical surface generating machine 11 including the optical lap 12 operatively coupled to the carriage head assembly 13. Positioned below and supporting the lap 12 is the work surface 14 of the optical blank 15 that is mounted on the transport table 16. The head assembly 13 is adapted for longitudinal movement in an $x-x$ direction along the rails 17 and 17'. Supporting the ends of the parallel rails 17 and 17' are the traverse mounts 18 and 19 adapted for longitudinal movement in a $y-y$ direction along the parallel rails 20 and 21. The $y-y$ rails 20 and 21 are perpendicularly related to the $x-x$ rails 17 and 17' and are supported by the frame assembly 22. Predictable movement of the head assembly 13 along either or both the $x-x$ rails 17 and 17' and the $y-y$ rails 20 and 21 is controlled by the control unit 23 that is operatively connected to the surface generating machine 11 by the electrical cable 24. The makeup and function of the control unit 23 is described in greater detail hereinbelow.

As shown, the head carriage 13 is supported from the guide rail 17 by two pair of spaced apart conically shaped roller bearings 29 and from the guide rail 17' by a single pair of cylindrically shaped roller bearings 29'. Thus, $x-x$ alignment of the carriage is maintained along the rail 17 by bearings 29 while some degree of lateral carriage movement with respect to rail 17' is permitted by the bearings 29'. For this reason, longitudinal movement of the carriage 13 along the guide rails 17 and 17' is not hampered by slight misalignments therebetween.

Figure 2:
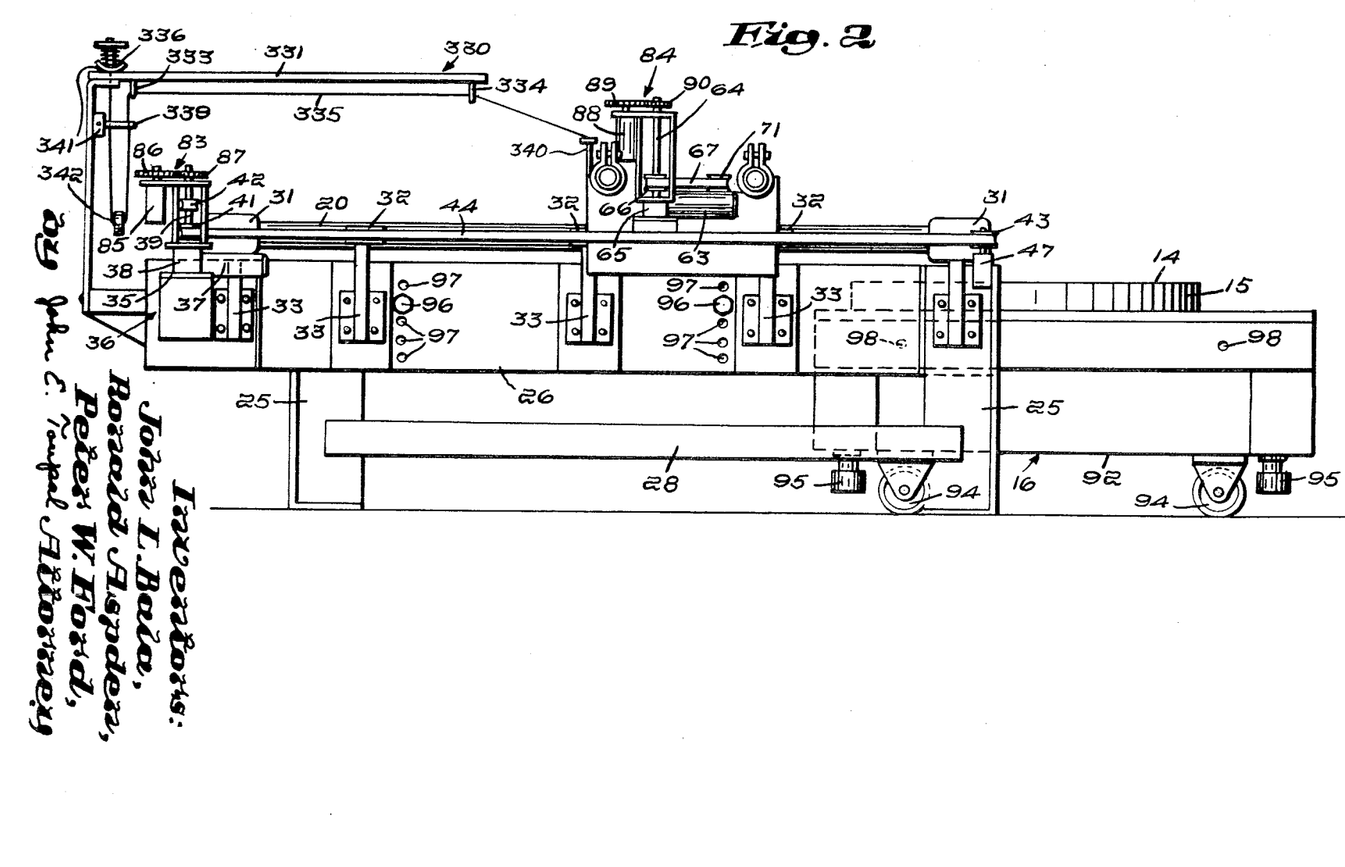
FIG. 2 is a side view of the $x-y$ machine shown in FIG. 1.
Figure 3:
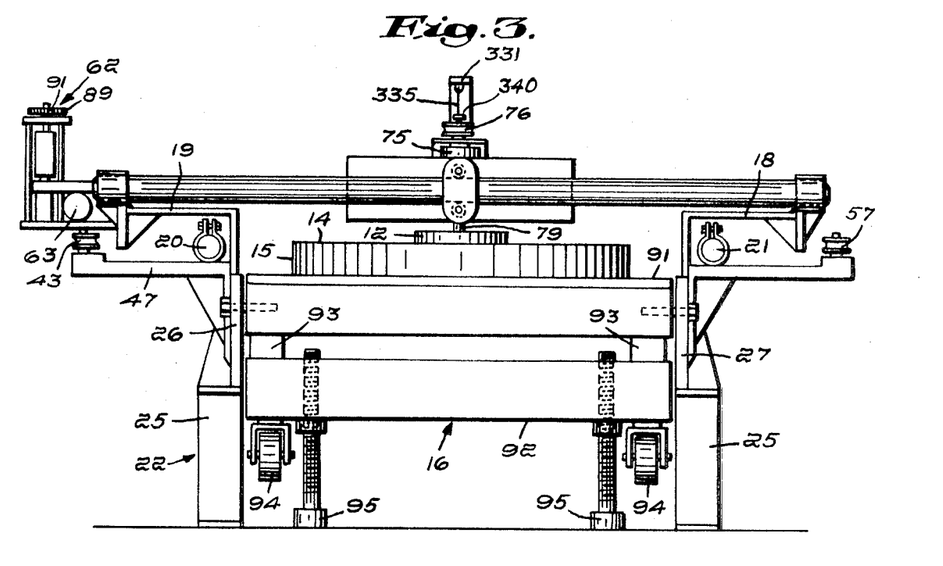
FIG. 3 is a front view of the $x-y$ machine shown in FIG. 1.
Figure 4:
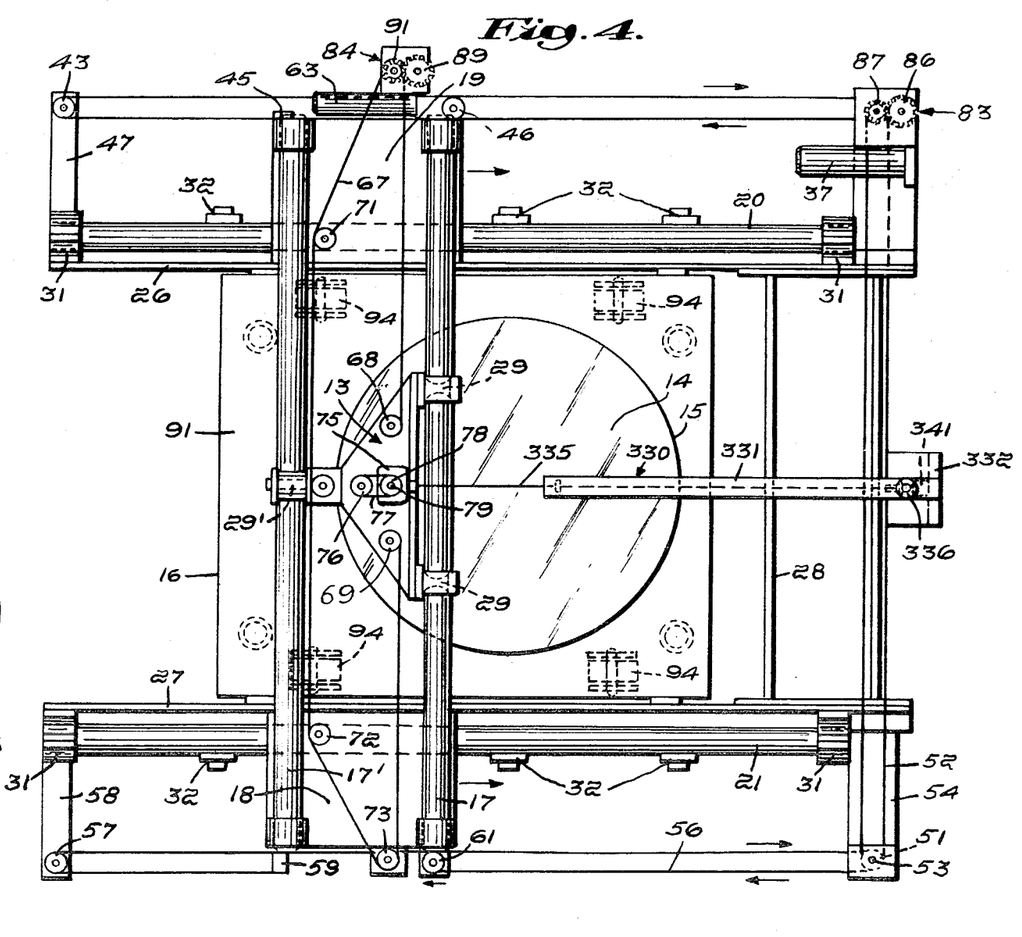
FIG. 4 is a top view of the $x-y$ machine shown in FIG. 1.

Referring now to FIGS. 2—4, the frame 22 is formed by corner legs 25 that support the parallel sidewalls 26 and 27 and the guide braces 28. Supporting the y-y rails 20 and 21 from, respectively, the sidewalls 26 and 27 are the end rail supports 31 and the midrail supports 32 all secured to the sidewalls 26 and 27 by the mounting brackets 33.

Also supported from the sidewall 26 on the mounting bracket 35 is the y-y drive assembly 36 including the y-y axis drive motor 37. The gearbox 38 couples the drive motor 37 to the shaft 39 that is keyed for rotation with both the lower pulley 41 and the upper pulley 42. Operatively engaged with the lower drive pulley 41 and the return pulley 43 is the y-y timing belt 44 having ends 45 and 46 attached to opposite sides of the traverse mount 19. The return pulley 43 is supported from the end wall 26 by the mounting bracket 47. Operatively engaged with the upper drive pulley 42 and the return pulley 51 is the second y-y timing belt 52. The return pulley 51 is keyed for rotation with the shaft 53 that is rotatably supported by the mounting bracket 54. Also keyed for rotation with the shaft 53 is the lower pulley 55 that drives the third y-y timing belt 56. The timing belt 56 extends around the return pulley 57 supported by mounting bracket 58 and has ends 59 and 61 secured to opposite sides of the traverse table 18.

Movement of the head assembly 13 on the rails 17 and 17' is produced by the x-x drive mechanism 62 supported by the traverse mount 19. The drive mechanism 62 includes the x-x axis drive motor 63 operatively coupled to the drive shaft 64 by the gearbox 65. Keyed for rotation with the shaft 64 is the drive pulley 66 that engages the x-x timing belt 67. Secured to the head assembly 13 are the opposite ends 68 and 69 of the x-x timing belt 67 that extends around the guide pulley 71 mounted on the traverse table 19 and around the guide pulley 72 and return pulley 73 both mounted on the traverse mount 18. Also supported by the head assembly 13 is the lap drive motor 75 and associated drive pulley 76. The drive belt 77 transfers rotary motion between the drive pulley 76 and the lap pulley 78 that is keyed for rotation with the lap 12 via the shaft 79.

Information regarding the x-y coordinate position of the lap 12 with respect to the work surface 14 is fed to the control unit 23 by the y-y position feedback unit 83 supported by the mounting bracket 35 and by the x-x position feedback mechanism 84 supported by the traverse mount 19. The y-y position indicator 83 includes the conventional encoder 85 that is operated by the spur gear 86. Driving the gear 86 is the mating spur gear 87 keyed for rotation with the y-y drive shaft 39. Similarly, the x-x position indicator 84 comprises a conventional encoder 88 operatively coupled to the x-x drive shaft 64 by the mating spur gears 89 and 90.

The transport table 16 includes the blank accommodating platform 91 supported from the rectangular frame 92 by the corner posts 93. Mounted under the corners of the rectangular frame 92 are the casters 94 that provide mobility for the transport table 16. Also mounted in the corners of the frame 92 adjacent the casters 94 are the conventional power operated jacks or actuators 95 adapted for vertical movement with respect to the transport table 16. The actuators 95 are synchronously driven in the vertical direction by a conventional motor drive unit (not shown) supported by the frame 92.

During typical operation, the optical blank 15 is accurately positioned on the platform 91 at a suitable remote location. The table 16 is then transported on the casters 94 to the surface generating machine 11 and pushed through the open end of the frame 22 as indicated in FIG. 2. After having been horizontally positioned relative to the y-y rails 20 and 21, the actuators 95 are actuated to produce vertical movement of the platform 91 into a desired vertical position with respect to the sidewalls 26 and 27 as indicated in FIG. 3. The table 16 is secured in the desired position by insertion of the support bolts 96 through whichever of the vertically spaced sidewall openings 97 are horizontally aligned with the mounting apertures 98 disposed at the corners of the platform 91. In this way, the position of optical blank's work surface 14 is first established and then maintained during a polishing operation.

After location of the transport table 16 within the surface generating machine 11, the control unit 23 is turned on to initiate selective intermittent energization of the y-y drive motor 37 and the x-x drive motor 63. In response to that energization, the operatively coupled head 13 and lap 12 are selectively and independently moved in both the x-x direction defined by the rails 17 and 17' and the y-y direction defined by the rails 20 and 21. By suitably combining these x-x and y-y components of movement, the lap 12 can be moved across the work surface 14 along any path desired. A highly preferred method for prescribing movement of lap 12 with respect to work surface 14 is disclosed in the above noted U.S. Pat. application Ser. No. 719,657. According to the method disclosed therein, the work surface 14 can be predictably modified in any manner desired.

Figure 5:
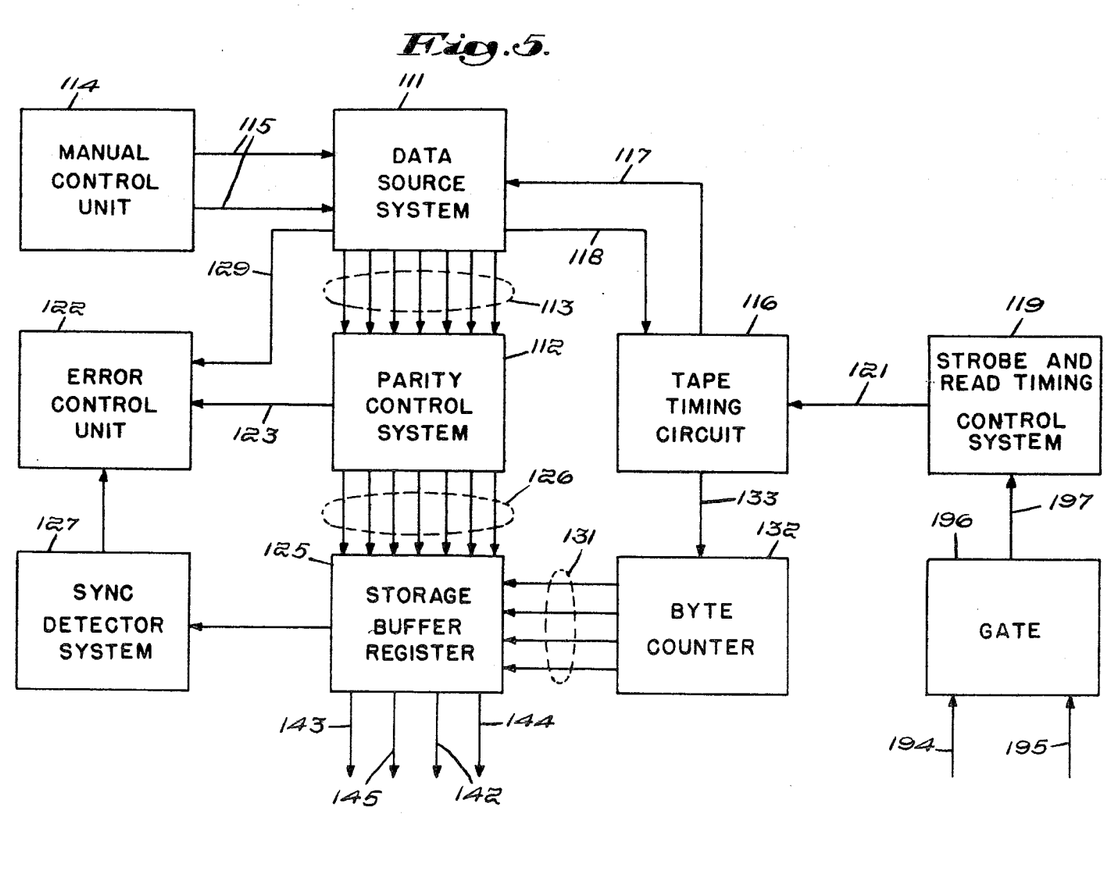
FIGS. 5 and 6 together are a block diagram of a preferred control system for the machine shown in FIGS. 1—4.
Figure 6:
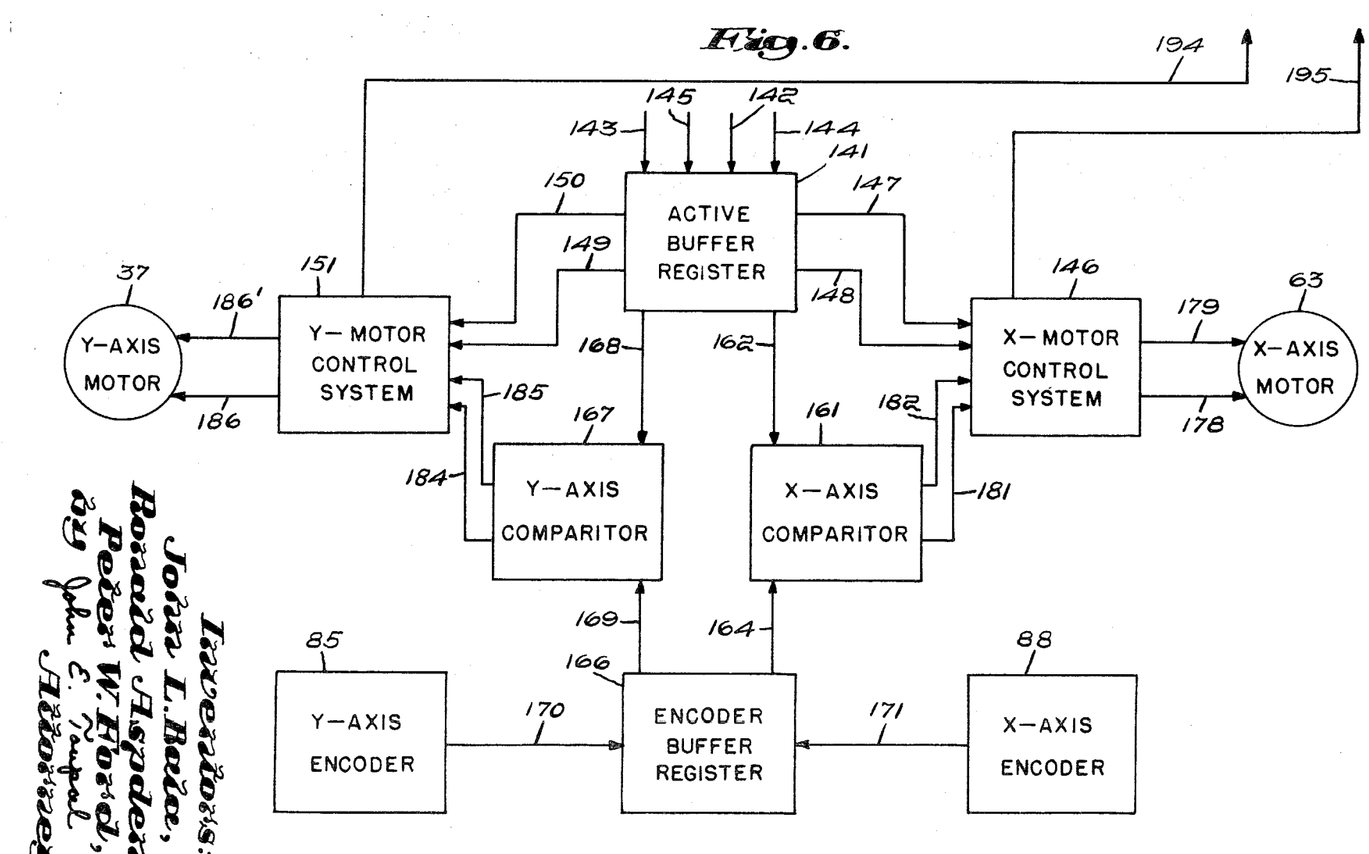

FIGS. 5 and 6 show in block diagram form the circuitry included in the control unit 23 shown in FIG. 1. FIG. 5 shows the data source system 111 comprising conventional magnetic tape controls including a tape reader and tape interface. The data source system 111 provides digitized information to the parity control system 112 on the data flow lines 113. Connected to the data source system 111 by lines 115 is the manual control unit 114. Also connected to the data source system 111 is the tape timing circuit 116 that provides timing pulses on line 117 and receives signal indications on line 118 when readout of a line has been completed. The strobe and read timing control 119 feeds timing pulses to the timing circuit 116 on line 121.

The data source system 111 sequentially provides on lines 113 data representing predetermined x and y coordinate objectives for the lap 12 with respect to the work surface 14. Also provided is information indicating the senses of x and y movement required to reach the objectives. Additional pulse information is transmitted for checking both synchronism and parity. These latter pulses are used by the parity control system 112 to verify the legitimacy of the information supplied. Indications of information errors are received by the error control unit 122 from the parity control system 112 on line 123.

The coordinate objective data from the data source 111 is relayed also to the storage buffer register 125 on the data flow lines 126. In addition to transforming the coordinate objective data from serial to parallel form, the storage buffer register 125 sends characters to the sync detector 127. Indications of errors in synchronism are transmitted to the control unit 122 on signal line 128. Also received by the control unit 122 from the data source 111 on line 129 are signals indicating tape errors e.g. a broken or completed tape. In the event of errors of any type, the error control unit 122 responds to interrupt operation of the entire system.

Controlling the compilation of each byte of information registered in the storage buffer register 125 are signals received on lines 131 from the byte counter 132. Signals indicating that a readout has been completed by the data source 111 are received by the byte counter 132 on the signal line 133. It will be obvious that the various control circuits illustrated in FIG. 5 are conventional and of the type utilized in a wide variety of digital information systems. Accordingly, a more detailed description of the exact circuitry involved is deemed unnecessary.

Referring now to FIG. 6 there is shown the active buffer register 141 that receives, in digital form, the x and y coordinate objective data from the storage register 125 on lines 142 and 143, respectively. Also received by the active buffer register 141 on lines 144 and 145, respectively, is the polarity data indicating the sense of movement required to establish the accompanying coordinate objectives. The register 141 produces an output signal either on line 147 if lap movement in a positive x-direction is required or on line 148 if movement in a negative x-direction is required. Receiving these signals is the x-motor control system 146. Similarly, the register 141 produces signals on either positive line 149 or negative line 150 depending on the required y-direction of lap movement. These signals are received by the y-motor control system 151.

The x-comparitor circuit 161 receives on line 162, data representing the x-coordinate objective then retained by the active buffer register 141. This information is compared by the x-comparitor circuit 161 with data received on line 164 representing the current x-coordinate position of the lap 12 as indicated by the encoder register 166. Similarly, the y-comparitor circuit 167 compares data received on line 168 representing the y-coordinate objective then retained by the active buffer register 141 with data received on line 169 representing the present y-coordinate position of the lap 12 as indicated by the encoder register 166. The x and y-coordinate values registered in the encoder register 166 are determined by information received on lines 170 and 171 from, respectively, the y-axis encoder unit 85 and the x-axis encoder unit 88.

The x-comparitor circuit 161 produces a control signal on line 181 if the x-coordinate values retained by the active buffer register 141 and the encoder register 166 are equal and a control signal on line 182 if these values are not equal. Responsive to a control signal on line 182, the x-motor control system 146 furnishes energizing pulses to the x-axis drive motor 63 on either forward line 178 or reverse line 179 depending upon the polarity information received on lines 147 and 148. Conversely, a signal on line 181 interrupts the flow of drive pulses from x-motor control system 146. In the same manner, the y-comparitor circuit 167 provides a control signal on line 184 when the values of the y-coordinate positions retained by the active buffer register 141 and the encoder register 166 are equal and a control signal on line 185 when these values are not equal. Responsive to a control signal on line 185, the motor control system 151 feeds energizing pulses to the y-axis drive motor 37 on either forward line 186 or reverse line 186' depending upon the polarity information received on lines 149 and 150. With the exception of the x-motor control system 146 and the y-motor control system 151 which are described in greater detail below, the circuits shown in FIG. 6 are conventional and of the type used in a variety of digital control systems. Therefore, a more detailed description of the specific circuitry involved is deemed unnecessary.

According to a preferred method of operation, the work surface 14 of the optical blank 15 is first measured with suitable test apparatus. The measurements can be made mechanically, for example, with dial indicators or traversing probes. However, the measurements are preferably made in the conventional manner by a interferometer which produces an interference picture indicating the contour characteristics of the surface 14. Next, the work surface 14 is figuratively divided into a plurality of adjacent surface areas and the interference picture utilized to determine, with respect to a desired surface contour, the relative elevational errors existing in each of the surface areas. Preferably, the surface areas are approximately equal in size to that of the optical lap 12. The derived contour information is then used to establish a suitable path in which the optical lap 12 should move across the work surface 14 so as to correct the relative elevational errors initially existing thereon. Such a path is conveniently established by a computer programmed to identify the desired path in terms of the x and y-coordinate positions of the successive work surface 14 areas through which the lap 12 is to move. A more complete description of a method suitable for determining such a path of lap movement is presented in the above noted U.S. Pat. application Ser. No. 719,657.

Next, the derived lap travel path information is recorded in conventional digital form on a magnetic tape which is inserted into the data source system 111. After actuation of the manual control unit 114, the data source 111 begins to feed x and y-coordinate objective data into both the parity control system 112 and the storage register 125. Upon the transfer of data representing one coordinate objective to the active buffer register 141, the storage register 125 is automatically cleared and receives from the data source 111, information representing the next desired lap objective. As described above, the comparitors 161 and 167 compare the objective data retained by the active register 141 with the position data retained by encoder register 141 and produce appropriate signals on lines 181, 182, 184 and 185. Responsive to these signals and the polarity information received on lines 147—150, the x-motor control system 146 and y-motor control system 151 produce rotation of the x and y-drive motors 63 and 37 in directions required to move the lap 12 toward the desired coordinate objective on the work surface 14.

Once an objective is reached as indicated by equal x and y-coordinate values in the active register 141 and the encoder register 166, the motor control systems 146 and 151 produce signals on lines 194 and 195, respectively. Responsive to coincident signals on lines 194 and 195 the gate 196 (FIG. 5) provides an enabling signal on line 197 that causes the control system 119 to initiate transfer of the coordinate objective previously complied by the storage register 125 to the active register 141. This frees the storage register 125 to receive data representing the next coordinate objective from the data source 111. Again, the x and y-comparitor systems 161 and 167 produce appropriate energization of the x and y drive motors 63 and 37 until the new position is reached by the lap 12 as indicated by the information registered in the encoder register 166. Thus, the optical lap 12 is continuously moved across the work surface 14 in a path determined by the data stored on the magnetic tape in the data source 111. Because of this controlled movement, any desired elevational corrections, either symmetrical or asymmetrical, can be accurately and predictably produced on the work surface 14.

The x and y motor control systems 146 and 151 shown in FIG. 6 are uniquely adapted to obviate problems associated with the generation of high quality optical surfaces. As shown in FIG. 7, the x-axis motor control system 146 includes gates 201 and 202 that receive the signals on lines 182 and 181, respectively, and apply control signals to the flip-flop circuit 203 on lines 204 and 205, respectively. Also received by the gate 201 are the signals appearing on line 200. Connected between the flip-flop circuit 203 and the integrator circuit 206 by line 210 is the manually controlled selector switch 207. An additional output of the flip-flop circuit 203 is applied by line 195 to the gate 196 (FIG. 5). Each of the plurality of different valued resistors 208 is connected in series with a different pair of contacts 209 in the selector switch 207.

The output of the integrator circuit 206 is applied on signal line 211 to both the Schmitt trigger circuit 212 and the variable, voltage dividing potentiometer 213. Receiving the output of the Schmitt trigger circuit on signal line 214 is the x-sign test circuit 215 that also receives input signals on lines 147 and 148. The voltage to current converter circuit 216 receives the output voltage from the potentiometer 213 on line 217. Responsive to the control signal received on line 218, the current controlled oscillator 219 generates motor drive pulses on line 220.

During operation of the x-axis motor control system 146, the appearance of a signal on line 182 causes the gate 201 to set the flip-flop 203 unless a simultaneous inhibiting signal appears on the sign change signal line 200. Setting of the flip-flop 203 produces an output voltage on line 210, the duration of which is determined by manual adjustment of the selector switch 207. Conversely, the appearance of a signal on line 181 causes the gate 202 to clear the flip-flop 203 disabling output line 210 and establishing a signal on line 195. Responsive to a signal on line 210 the integrated output of the integrator circuit 206 exceeds the threshold voltage of the Schmitt trigger circuit 212 which applies an inhibiting voltage to the x-sign test system 215 on signal line 214. The function and makeup of the x-sign test system 215 is described in greater detail below. After having been selectively attenuated by the potentiometer 213, the integrated output voltage of the integrator circuit 211 is converted by the voltage to current circuit 216 to an output current that establishes the pulse frequency output of the current controlled oscillator 219.

Figure 8:
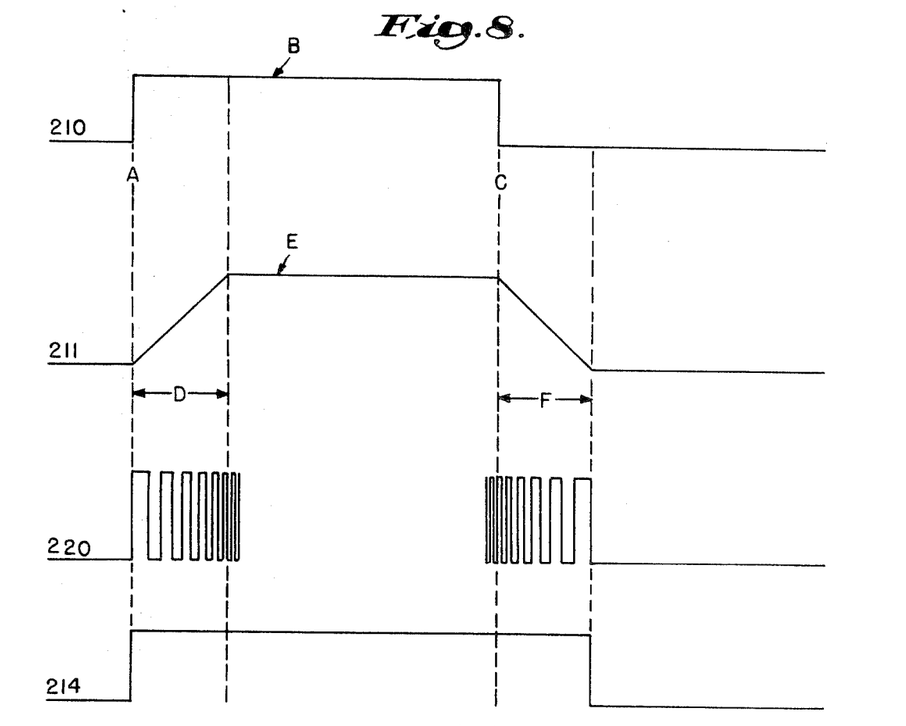
FIG. 8 illustrates typical waveforms generated on certain signal lines shown in FIG. 7.

FIG. 8 shows typical waveforms generated in the x-axis motor control system 146. For convenience, the respective signal waveforms are identified in FIG. 8 by the numbers applied to the FIG. 7 signal lines on which they appear and the various signals shown are related to each other in a time sense. As illustrated at time A, the presence of a control signal on line 182 in the absence of inhibiting signal on line 200 sets the flip-flop 203 which produces an output voltage B on line 210. At time C, a control signal on line 181 clears the flip-flop 203 eliminating the output voltage B on line 210.

The integrator circuit 206 integrates the control voltage B producing on output line 211 an output voltage that increases linearly during time period D to a maximum value E and then decreases linearly to zero during time period F that begins at time C and is equal to time period D. The leading and trailing slopes of the waveform generated on line 211 are determined by the circuit values of the integrator circuit 206 including the selected resistor 208. Thus, any of eight different overshoot periods F represented by the eight resistors 208 can be established by selective adjustment of the switch 207.

Responsive to the voltage to current converted output on line 211, the current controlled oscillator 219 produces on line 220 a pulse output having a frequency that increases during time period D to a maximum value maintained during time period E. The pulse output frequency then decreases to zero during time period F. After being transferred by the x-sign circuit to either line 178 or 179 as described below, these pulses energize the x-axis drive motor 63. Obviously, the pulse motor 63 accelerates during time period D to a maximum speed during time period E and decelerates during time period F. The maximum motor speed during time period E is determined by the amplitude of the voltage applied to the voltage to current converter circuit 216 which can be selected by manual adjustment of the voltage dividing potentiometer 213. During the entire time that an output voltage appears on line 211, the Schmitt trigger circuit 212 is activated to produce an inhibiting voltage on line 214. This voltage is applied to the x-sign test system 216 and prevents a reversal in the direction of rotation of the x-axis drive motor 63 as described below.

Figure 9:
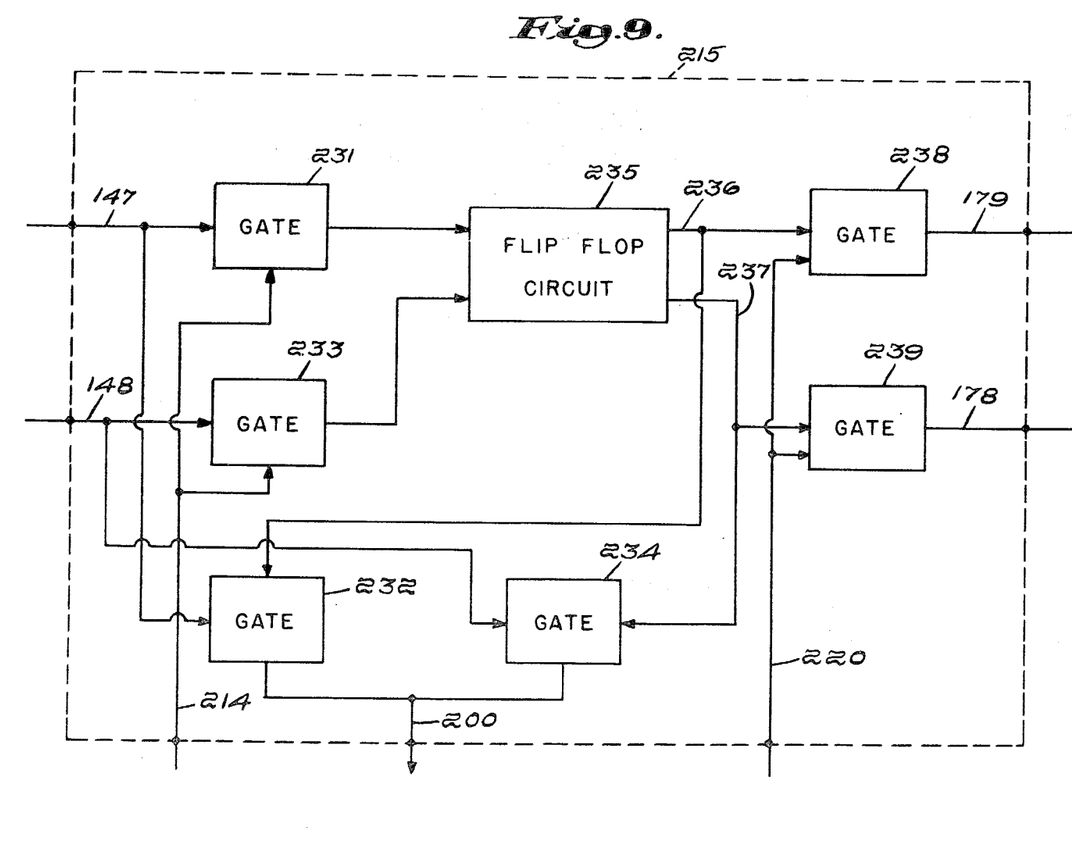
FIG. 9 is a block diagram of the $x$-sign test system shown in FIG. 7.

Referring now to FIG. 9 there is shown a block circuit diagram of x-sign test system 215. The positive direction signals on line 147 are applied to both the gates 231 and 232. Similarly, the negative direction signals on line 148 are applied to both gates 233 and 234. Each of gates 231 and 233 also receive the output of the Schmitt trigger 212 on line 214. Responsive to the inputs from gates 231 and 233, the flip-flop circuit 235 produces on either line 236 or line 237 enabling signals that are applied to, respectively, the reverse control gate 238 or the forward control gate 239. These gates also receive the motor drive pulses produced by the oscillator 219 on line 220. The output signals of the flip-flop circuit 235 on lines 236 and 237 are also applied, respectively, to the gates 232 and 234 which both provide output signals on line 200.

During operation of the circuit shown in FIG. 9, the appearance of a positive direction indicating signal on line 147 produces an enabling signal on flip-flop output line 237 and a disabling signal on line 236. Conversely, the appearance of the negative direction indicating signal on line 148 produces an enabling signal on flip-flop output line 236 and a disabling signal on line 237. However, neither a positive indicating signal on line 147 or a negative indicating signal on line 148 is effective to alter the output of the flip-flop 235 if an inhibiting signal is present on the signal line 214 connected to each of the gates 231 and 233. The gate 232 provides an inhibiting signal on line 200 only when both of lines 147 and 236 are enabled and gate 234 produces an inhibiting signal on line 200 only when both lines 148 and 237 are enabled.

The y-axis motor control system 151 is identical to the x-axis control system 146 shown in FIGS. 7 and 9. Also, the waveforms produced by the y-axis system 151 are identical to those shown in FIG. 8. For this reason, a further description of the y-axis control system 151 will not be given.

Figure 10:
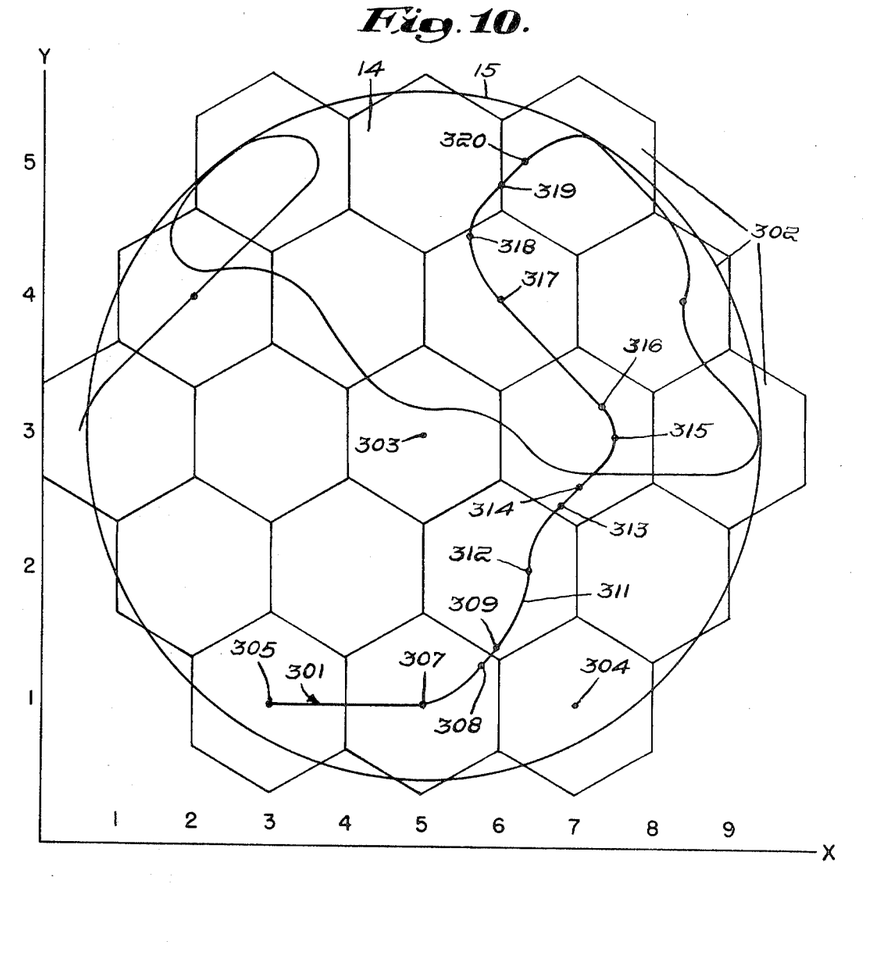
FIG. 10 is a schematic representation illustrating a typical lap travel path across the work surface of an optical blank.

An illustration of the unique lap movement produced by the invention is presented in FIG. 10 wherein a portion of a typical path of lap travel is represented. The path 301 represents the movement of the center of lap 12 across the work surface 14 of the optical blank 15. The work surface 14 is figuratively divided into an array of hexagonally shaped areas 302 which can be identified according to the Cartesian coordinate positions of their centers. Thus, the center area 303, for example, is identified by coordinate position $x=5$, $y=3$, the lower right hand area 304 is identified by coordinates $x=7$, $y=1$, etc.

As summarized above, the work surface 14 is measured and the contour information obtained is used to establish a path of lap movement that will produce a desired surface change. Preferably, the diameter of the lap 12 approximates the diameters of the individual areas 302 and lap travel path is identified by the coordinate positions of the successive areas 302 through which the lap moves. Thus, the lap travel path 301 illustrated in FIG. 10 beginning at point 305 would be identified by the coordinate positions $x=3$, $y=1$; $x=5$, $y=1$; $x=6$, $y=2$; $x=7$, $y=3$; $x=6$, $y=4$; $x=7$, $y=5$; $x=8$, $y=4$; etc. The method utilized for determining the specific lap travel path required to generate a given surface correction does not, per se, form a portion of the present invention and is therefore not to be described in detail. However, a complete description of such a method appears in the above noted U.S. Pat. application Ser. No. 719,657.

Assuming that the center of the lap 12 is in the position represented by point 305 in FIG. 10, the x and y encoders 88 and 85 (FIG. 6) establish, respectively, coordinate values of $x=3$, $y=1$ in the encoder register 166. Assume also that the next desired coordinate position $x=5$, $y=1$ has been fed into the active buffer register 141. Since the y coordinate values in both the active register 141 and the encoder register 166 are equal, the y comparitor circuit 167 produces a signal on line 184. Responsive to that signal, the y-axis control system 151 produces no pulses on lines 186 and 186' and the y-axis motor 37 is deenergized.

Conversely, the x-coordinate values in the active register 141 and the encoder register 166 are not equal and the x-comparitor 161 produces a signal on line 182. Also, since the required move is in a positive x direction, the active buffer register 141 produces an enabling signal on positive direction line 147 and a disabling signal on negative direction line 148. Assuming further that the previous move also was in a positive direction, the forward direction output line 237 of flip-flop 235 (FIG. 9) is enabled and reverse line 236 is disabled. Therefore, neither gate 232 or 234 receives the simultaneous enabling signals required to produce a disabling signal on line 200.

Responsive to the enabling signal on line 182 and the absence of disabling signal on line 200, the gate 201 (FIG. 7) sets the flip-flop circuit 203 producing an output signal on line 210. Thus, as described above, the current controlled oscillator 219 generates a pulse train on line 220 that is transmitted by the open gate 239 (FIG. 9) and results in positive rotation of the x-axis motor 63. Accordingly, the center of the lap 12 is moved only in the x direction as shown by the initial portion of path 301 shown in FIG. 10.

When the center of lap 12 reaches the position represented by point 307 an $x=5$ value is established in the encoder register 166 (FIG. 6) by the x encoder 88. As this equals the x value present in the active buffer register 141, the x comparitor 161 disables line 182 and produces on line 181 a signal that is passed by gate 202 (FIG. 7) to the flip-flop 203 on line 205. Responsive to that signal the flip-flop 203 eliminates an output signal from line 210 as indicated at time C in FIG. 8 and produces a signal on line 194 that is applied to gate 196 (FIG. 5). Because the y coordinate values in the active register 141 and the encoder register 146 also are equal, a similar signal is received by the gate 196 from the y-motor control system 151 on line 195. Responsive to the coincident signals on lines 194 and 195, the gate 196 activates the strobe and read timing control system 119. As described above, this causes the data source 111 to transfer data identifying a new coordinate position into the storage register 125 which in turn transfers data regarding the previously stored position into the active register 141.

The new data received by the active register 141 identifies the hexagonal area at $x=6$, $y=2$ which is the next area on the path 301 as shown in FIG. 10. Now, with a $x=5$, $y=1$ position retained by the encoder register 166 and a $x=6$, $y=2$ position retained by the active register 141, both the x comparitor 161 and the y comparitor 167 (FIG. 6) produce motor drive signals on, respectively, lines 182 and 185. Responsive to the signal on line 182, the flip-flop circuit 203 (FIG. 7) is again set producing on line 210 an output signal B shown in FIG. 8. Because the time period required to transfer new position data and to reset the flip-flop 203 is extremely short compared to the period F shown in FIG. 8, the output of the integrator circuit 206 on line 211 quickly reaches again the maximum value E. Therefore, the frequency output of the current controlled oscillator 219 on line 183 substantially remains at maximum value. Accordingly, x-axis motor 63 continues to run at maximum speed.

The y-axis motor 37, however, which was formerly deenergized, responds to output pulses from the y motor control system 151 and undergoes a period of acceleration before reaching maximum speed. This period corresponds to the period D shown in FIG. 8 with respect to the x motor control system 146. Because of the different x and y motor speeds during the y motor acceleration period, the lap center follows the curved path shown in FIG. 10 between point 307 and point 308 at which the y motor 37 reaches full speed. Between points 308 and 309 both x and y motors are being driven at equal maximum speeds so that the lap center moves on a path spaced 45° from the coordinate axes.

When the lap center reaches point 309 shown in FIG. 10, both the active register 141 and the encoder register 166 retain x coordinate values of six. Accordingly, the x comparitor 161 (FIG. 6) produces a signal on line 181. After passing through gate 202 (FIG. 7), this signal clears the flip-flop 203 eliminating the control voltage on line 210 and producing a signal on line 194. However, because of the integration performed by the integrator circuit 206, the pulse output of the current controlled oscillator 219 does not immediately drop to zero but experiences the deceleration represented by the period F in FIG. 8. During this period the y-axis motor 37 continues to run at maximum speed because the lap center has not yet reached the $y=2$ coordinate value retained by the active register 141 and the y motor control system 151 continues to supply maximum pulse rate on forward line 186. Therefore, the lap center follows the curved path illustrated in FIG. 10 between points 209 and 311. At position 311 the deceleration period F (FIG. 8) ends terminating pulse output from the current controlled oscillator 219. This deenergizes the x-axis motor 63 and eliminates lap movement in the x-direction. Thus, between positions 311 and 312 only the y-axis motor 37 is operated and the lap center moves along a vertical path.

At point 312 the $y=2$ objective is also reached and the y comparitor 167 produces a signal on line 184. Responsive to that signal indicating that the y objective has been reached, the y motor control system 151 produces a signal on line 194. This signal is applied to the gate 196 (FIG. 5) along with the analogous signal first generated on line 195 by the x motor control system 146 at position 309 in response to attainment of the $x=6$ objective. The gate 196 responds to the coincident signals by actuating the timing control system 119. Consequently, a new coordinate position is fed into the storage register 125 which in turn transfers data representing the previously stored $x=7$, $y=3$ position into the active buffer register 141.

The new coordinate values in the active buffer register 141 result in inequalities in both the xcomparitor 161 and the y-comparitor 167 which produce signals on lines 182 and 185, respectively. Since both the $x=7$ and $y=3$ objectives are positive with respect to the previously reached $x=6$, $y=2$ position, no direction reversal function occurs in either the x motor control system 146 or the y motor control system 151. Therefore, any motor drive pulses continue to appear on forward control lines 178 and 186. As noted above, the time required to establish new coordinate objective control signals is small with respect to the motor deceleration period F (FIG. 8). Consequently, the y-axis motor 37 resumes rotation at maximum speed with substantially no period of deceleration. Conversely, the x-axis motor 63 which had come to a complete stop at position 311 (FIG. 10) must be exponentially accelerated during a period D (FIG. 8) before reaching maximum speed.

Because of the different motor speeds during the acceleration of x-motor 63, the lap center again follows a curved path between the positions represented by points 312 and 313 in FIG. 10. There the x-axis motor 63 reaches maximum speed equal to that of the y-axis motor 37 and the lap center travels at a 45° angle to the coordinate axes between point 313 and point 314 where the $x=7$ objective is reached. Upon attainment of the x objective, the x comparitor 161 establishes a signal on line 181 causing the x motor control system 146 to begin deceleration of the x-axis motor 63. During this deceleration period the lap center travels the curved path indicated between point 314 and point 315 where the $y=3$ objective is also reached.

After receiving a signal on line 197 indicating that both x and y objectives have been reached, the strobe and read timing control 119 (FIG. 5) functions as described above to initiate transfer into the active register 141 of data corresponding to the next desired lap position. For the example represented in FIG. 10, this new position is the $x=6$, $y=4$ hexagonal area. Again, both the x and y coordinate values retained by the active register 141 are unequal to those in the encoder register 166. The x comparitor 161 and the y comparitor 167 therefore produce control signals on signal lines 182 and 185, respectively. Since the y-axis motor 37 had been running at full speed in the positive direction and the newly required direction of y movement is again positive, the y motor control system 151 immediately resumes maximum pulse frequency output on line 186. Thus, the y-axis motor 37 continues to operate at full speed in the forward or positive y direction.

The new $x=6$ objective, however, is negative with respect to the existing $x=7$ lap position. Therefore, the active register 141 produces a signal on negative x direction signal line 148. This signal is immediately passed by the gate 233 (FIG. 9) since the x-axis motor 63 had already completed a deceleration phase represented by time period F (FIG. 8) thereby eliminating the inhibiting signal output from the Schmitt trigger circuit 212 on line 214. Responsive to the signal from the gate 233, the state of the flip-flop circuit 235 is reversed producing an enabling signal on line 236 and a disabling signal on line 237. Consequently, motor drive pulses on line 220 are passed by open gate 238 onto line 179 producing reverse drive of the x-axis motor 63. During the acceleration phase of the x-axis motor 63, the lap center follows the curved path between positions 315 and 316 (FIG. 10). At position 316 both x and y drive motors 63 and 37 are operating at maximum speed and the lap center moves at a 45° angle to the coordinate axes until reaching position 317 which fortuitously lies at exactly the $x=6$, $y=4$ objective.

Data representing the new $x=7$, $y=5$ objective is now transferred into the active buffer register 141. As before, the required direction of y movement continues to be positive and the y-axis motor 37 immediately resumes forward rotation at maximum speed without a deceleration period. The new $x=7$ objective also is positive with respect to the existing $x=6$ lap center position and the active register 141 supplies a signal on positive direction line 147. This signal, however, is not immediately passed by gate 231 (FIG. 9) because of an inhibiting signal on line 214. The inhibiting signal exists because the x-axis motor 63 had been operating at maximum speed in the opposite or negative x direction at position 317 and had not completed the deceleration period F (FIG. 8) required to eliminate signal output from the Schmitt trigger circuit 212 on line 214. Therefore, the flip-flop 235 continues to deliver an enabling signal on line 236 maintaining negative rotation of the x-axis motor 63 during its deceleration phase, and the center of the lap moves along the curved path having a negative x component between the positions 317 and 318 (FIG. 10).

At position 318 the x-motor deceleration period is completed and Schmitt trigger output eliminated from signal line 214. Consequently, the gate 231 (FIG. 9) passes the signal on line 147 reversing the state of the flip-flop 235 which produces an enabling signal on line 237 and a disabling signal on line 236. Drive pulses on line 220 are now passed by the opened gate 239 and the x-axis motor 63 accelerates in a positive direction. Thus, the lap center moves on the curved path between position 318 and position 319 (FIG. 10) at which the x-axis motor 63 reaches full speed. The lap then continues in a 45° angle toward position 320, where the y=5 objective is reached.

Continued operation of the control unit 23 in the manner just described produces movement of the lap center as diagrammatically illustrated in FIG. 10. The lap travel path proceeds successively through the objective areas lying in the coordinate positions $x=8, y=4; x=9, y=3; x=7, y=3; x=5, y=3; x=4, y=4; x=2, y=4; x=3, y=5; x=2, y=4;$ and $x=1, y=3$. It will be noted that only on fortuitous occasions does the lap center actually reach the actual center of an objective area. Examples of such occasions in the path shown are the $x=5, y=1$; the $x=6, y=4$; and the $x=2, y=4$ areas.

Thus, as illustrated by FIG. 10, the control system of the present invention provides extremely smooth movement of the lap 12 across the work surface 14. Regardless of which specific coordinate objectives comprise a desired travel path, the unique objective overshoots produced by the x and y motor control systems 146 and 151 prevent abrupt changes in the direction of lap movement. Because of this feature optical surfaces of exceptionally high quality can be generated.

Figure 11:
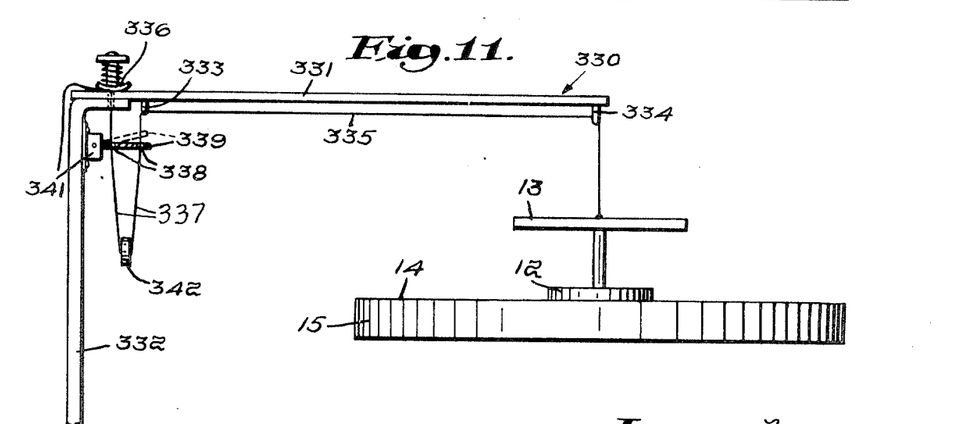
FIG. 11 is a schematic detailed view of the limit control mechanism shown in FIGS. 1—4.

Referring now to FIG. 11, there is shown an enlarged schematic representation of the limit control mechanism 330 shown in FIGS. 1—4. The support rod 331 is fixed to the bracket 332 mounted on the rear wall of the frame 22. Located at opposite ends of rod 331 are eyelets 333 and 334 that support the flexible cord 335. One end of the flexible cord 335 is fixed to the pin 340 on the lap carriage 13 and the other end is adjustably secured by the manually releasable, spring loaded catch 336. Included in the length of the flexible cord 335 is a looped portion 337 that extends through a pair of apertures 338 in the actuating lever 339 of the electrical switch 341. The double switch 341 has one pair of contacts 341' in line 220 (FIG. 7) and another pair of contacts similarly located in the y-motor control system 151. Secured to the flexible cord 335 so as to maintain tension on the looped portion 337 is the weight 342. The rod 331 is positioned such that the outer eyelet 334 is vertically aligned with the pin 340 when the center of the lap 12 is at the center of the work surface 14.

During use of the limit control mechanism 330, the length of the cord 335 is adjusted with the releasable catch 336 so as to provide the maximum radial movement desired for the lap 12. In a typical example, a cord length is selected such that the looped portion 337 is eliminated upon movement of the lap 12 to the edge of the work surface 14. Thus, upon movement of the lap carriage 13 in the manner described above to a position wherein the center of the lap 12 is above the edge of the optical blank 15, the cord 35 is completely extended causing the looped portion 337 to actuate the lever arm 339. This opens switch contacts 341' in both the x and y-motor control systems 146 and 151 eliminating motor drive pulses and preventing further movement of the lap 12. In this way, any possibility of inadvertent movement of the lap off the work surface 14 is eliminated.

It will be obvious that the cord 35 is uniformly extended regardless of the radial direction in which the lap 12 moves. Thus, the switch 341 is automatically actuated upon movement of the lap 12 a predetermined distance in any radial direction from the center of the work surface 14. Furthermore, by merely releasing the catch 336 and modifying the excess length of the flexible cord 335, the control mechanism 330 can be adjusted for response at any desired radial lap position. Therefore, the unit is easily adapted to accommodate an optical blank of any diameter.

Obviously, many modifications and variations of the present invention are possible in light of the above teachings. For example only, the disclosed system could be used to control the movement of surface modifying mechanisms other than optical laps. Also, other types of relative movement between lap and work surface could be utilized. For example, a polar coordinate system could be used to replace the Cartesian system disclosed. It is to be understood, therefore, that within the scope of the appended claims the invention can be practiced otherwise than as specifically described.

What We claim is:

1. A surface generating apparatus comprising support means adapted to support a workpiece, a surface modifying means for modifying the contour of the work surface of a workpiece supported by said support means, drive means for producing relative transverse movement between the work surface and said surface modifying means, said drive means adapted to provide between the work surface and said surface modifying means two independently controllable component directions of relative movement, data source means for providing objective data representing a desired path of relative movement between the work surface and said surface modifying means, energizing circuit means connected to receive said objective data from said data source means and adapted to respond thereto by selectively energizing said drive means so as to produce the desired path of relative movement, said energizing circuit means being further adapted to independently vary the velocity magnitudes of said components of relative movement so as to generate curved portions of substantial length in the path of relative movement produced between said surface modifying means and the work surface.

2. A surface generating apparatus according to claim 1 wherein said energizing circuit means varies said velocity magnitudes by producing predetermined nonsynchronized periods of deceleration in said components of relative movement.

3. A surface generating apparatus according to claim 1 wherein said energizing circuit means varies said velocity magnitudes by producing predetermined nonsynchronized periods of acceleration in said components of relative movement.

4. A surface generating apparatus according to claim 3 wherein said energizing circuit means also varies said velocity magnitudes by producing predetermined nonsynchronized periods of deceleration in said components of relative movement.

5. A surface generating apparatus according to claim 1 wherein said data source means sequentially provides objective data representing a plurality of predetermined relative positions between the work surface and said surface modifying means, said relative positions being identified by coordinate objectives in each of said component directions, and said energizing circuit means responds to said objective data by producing said components of relative movement in senses suitable to establish said identified coordinate objectives.

6. A surface generating apparatus according to claim 5 wherein said energizing circuit means is adapted to produce said components of relative movement in magnitudes that result in predetermined overshoots of said identified coordinate objectives.

7. A surface generating apparatus according to claim 6 wherein responsive to reception from said data source means of objective data representing a coordinate objective requiring a sense reversal in one of said component directions of relative movement said energizing circuit means is adapted to produce a deceleration of the relative movement in said one component direction during said overshoot therein.

8. A surface generating apparatus according to claim 7 wherein said energizing circuit means is further adapted to produce predetermined periods of acceleration in relative movement after sense reversals in said component directions.

9. A surface generating apparatus according to claim 7 wherein said energizing circuit means comprises position indicating means adapted to provide position data representing the existing relative position between the work surface and said surface modifying means, said position data identifying said existing relative position in terms of coordinate values in each of said component directions.

10. A surface generating apparatus according to claim 9 wherein said energizing circuit means is adapted to compare said objective data with said position data and to produce a substantially square wave output signal during periods wherein differences exist therein, and said energizing circuit means further comprises integrator circuit means connected to receive said square wave output signal and to provide an integrated output thereof for energizing said drive means.

11. A surface generating apparatus according to claim 10 wherein said energizing circuit mans is adapted to energize said drive means at a substantially uniform level during said overshoots in response to the reception from said data source means of objective data representing coordinate objectives not requiring a sense reversal in said component directions of relative movement.

12. A surface generating apparatus according to claim 11 wherein said drive means comprise electrical pulse driven motors and said energizing circuit means further comprises pulse generation means for generating motor drive pulses at a frequency proportional to the integrated output of said integrator circuit means.

13. A surface generating apparatus according to claim 12 wherein said drive means is adapted to provide movement of said surface modifying means in independently controllable orthogonally related directions.

14. A surface generating apparatus according to claim 13 wherein said objective data provided by said data source means is in digital form.

15. A surface generating apparatus according to claim 6 wherein said drive means comprises a first drive means adapted to produce one of said component directions of relative movement and a second drive means adapted to produce the other component direction of relative movement and said energizing circuit means comprises first energizing means for energizing said first drive means and a second energizing means for energizing said second drive means.

16. A surface generating apparatus according to claim 15 wherein said first energizing means is adapted to decelerate said first drive means during said overshoots in said one component direction in response to reception from said data source means of data representing a coordinate objective requiring a sense reversal in said one component direction of relative movement, and said second energizing means is adapted to decelerate said second drive means during said overshoots in said other component direction in response to reception from said data source means of data representing a coordinate objective requiring a sense reversal in said other component direction of relative movement.

17. A surface generating apparatus according to claim 16 wherein said first energizing means is adapted to produce a predetermined period of acceleration in relative movement in said one component direction after a sense reversal therein, and said second energizing means is adapted to produce a predetermined period of acceleration in relative movement in said other component direction after a sense reversal therein.

18. A surface generating apparatus according to claim 16 wherein said energizing circuit means comprises position indicating means adapted to provide position data representing the existing relative position between the work surface and said surface modifying means, said position data identifying said existing relative position in terms of coordinate values in each of said component directions.

19. A surface generating apparatus according to claim 18 wherein said energizing circuit means is adapted to compare said objective data with said position data and to produce a first substantially square wave output signal during periods wherein differences exist therein with respect to said one component direction and a second substantially square wave output signal during periods wherein differences exist with respect to said other component direction, and said first and second energizing means comprise integrator circuit means connected to receive said first and second square wave output signals and to provide integrated outputs thereof for energizing said first and second drive means.

20. A surface generating apparatus according to claim 19 wherein said first energizing means is adapted to energize said first drive means at a substantially uniform level during said overshoots in said one component direction in response to reception from said data source means of objective data representing a coordinate objective not requiring a sense reversal in said one component direction of relative movement, and said second energizing means is adapted to energize said second drive means at a substantially uniform level during said overshoots in said other component direction in response to reception from said data source means of objective data representing a coordinate objective not requiring a sense reversal in said other component direction of relative movement.

21. A surface generating apparatus according to claim 20 wherein said first and second drive means comprise electrical pulse driven motors, and said first and second energizing means comprise pulse generation means for generating motor drive pulses at frequencies proportional to the integrated outputs of said integrator circuit means.

22. A surface generating apparatus according to claim 21 wherein said first and second drive means are adapted to provide movement of said surface modifying means in independently controllable orthogonally related directions.

23. A surface generating apparatus according to claim 22 wherein said objective data provided by said data source means is in digital form.

24. A surface generating apparatus according to claim 1 wherein said surface modifying means comprises an optical lap.

25. A surface generating apparatus according to claim 24 wherein said support means comprises a transport table; said surface modifying means comprises a frame mounted carriage means supporting said optical lap and adapted for movement in said independently controllable component directions, and adjustment means for fixing the position of said transport table with respect to said frame, and wherein said transport table is independently mobile and detachable from said frame.

26. A surface generating apparatus according to claim 25 including limit control means adapted to automatically limit movement of said carriage means to a given distance in any radial direction about a predetermined position.

27. A surface generating apparatus according to claim 26 wherein said limit control means comprises switch means operable to deenergize said drive means in response to movement of said carriage means said given distance from said predetermined position.

28. A surface generating apparatus according to claim 25 wherein said carriage means is adapted for movement on said frame in orthogonally related component directions.

29. A surface generating apparatus according to claim 28 wherein said frame comprises a first pair of parallel guide rails supported for movement on a second pair of parallel guide rails orthogonally related to said first pair of guide rails, and wherein said carriage means is supported for movement from at least two positions on one of said first pair of guide rails and from only one position on the other of said first pair of guide rails.

30. A surface generating apparatus according to claim 24 wherein said data source means sequentially provides objective data representing a plurality of predetermined relative positions between the work surface and said surface modifying means, said relative positions being identified by coordinate objectives in each of said component directions, and said energizing circuit means responds to said objective data by producing said components of relative movement in senses suitable to establish said identified coordinate objectives.

31. A surface generating apparatus according to claim 30 wherein said energizing circuit means is adapted to produce said components of relative movement in magnitudes that result in predetermined overshoots of said identified coordinate objectives.

32. A surface generating apparatus according to claim 31 wherein said drive means comprises a first drive means adapted to produce one of said component directions of relative movement and a second drive means adapted to produce the other component direction of relative movement and said energizing circuit means comprises first energizing means for energizing said first drive means and a second energizing means for energizing said second drive means.

33. A surface generating apparatus according to claim 32 wherein said first energizing means is adapted to decelerate said first drive means during said overshoots in said one component direction in response to reception from said data source means of data representing a coordinate objective requiring a sense reversal in said one component direction of relative movement, and said second energizing means is adapted to decelerate said second drive means during said overshoots in said other component direction in response to reception from said data source means of data representing a coordinate objective requiring a sense reversal in said other component direction of relative movement.

34. A surface generating apparatus according to claim 33 wherein said first energizing means is adapted to produce a predetermined period of acceleration in relative movement in said one component direction after a sense reversal therein; and said second energizing means is adapted to produce a predetermined period of acceleration in relative movement in said other component direction after a sense reversal therein.

35. A surface generating apparatus according to claim 33 wherein said energizing circuit means comprises position indicating means adapted to provide position data representing the existing relative position between the work surface and said surface modifying means, said position data identifying said existing relative position in terms of coordinate values in each of said component directions.

36. A surface generating apparatus according to claim 35 wherein said energizing circuit means is adapted to compare said objective data with said position data and to produce a first substantially square wave output signal during periods wherein differences exist therein with respect to said one component direction and a second substantially square wave output signal during periods wherein differences exist with respect to said other component direction, and said first and second energizing means comprise integrator circuit means connected to receive said first and second square wave output signals and to provide integrated outputs thereof for energizing said first and second drive means.

37. Optical surface generating apparatus comprising a frame; lap carriage means mounted on said frame for controlling an optical lap; drive means for producing movement of said carriage means in two independently controllable component directions on said frame; a transport table detachable from and independently mobile with respect to said frame for supporting an optical blank in a plane parallel to said independently controllable component directions; adjustment means for positioning said transport table with respect to said frame, said adjustment means including first means for positioning said table in a direction parallel to said plane and second means for positioning said table in a direction perpendicular to said plane; and, means for releasably securing said transport table to said frame in said adjusted position.

38. An optical surface generating apparatus according to claim 37 including limit control means adapted to automatically limit movement of said carriage means to a given distance in any radial direction about a predetermined position.

39. An optical surface generating apparatus according to claim 38 wherein said limit control means comprises switch means operable to deenergize said drive means in response to movement of said carriage means said given distance from said predetermined position.

40. An optical surface generating apparatus according to claim 37 wherein said carriage means is adapted for movement on said frame in orthogonally related component directions.

41. An optical surface generating apparatus according to claim 40 wherein said frame comprises a first pair of parallel guide rails supported for movement on a second pair of parallel guide rails orthogonally related to said first pair of guide rails, and wherein said carriage means is supported for movement from at least two positions on one of said first pair of guide rails and from only one position on the other of said first pair of guide rails.

42. An optical surface generating apparatus comprising a frame, a lap carriage means mounted on said frame and adapted to control an optical lap, said carriage means adapted for movement in two independently controllable component directions on said frame, drive means for producing movement of said carriage means in the independently controllable component directions, a table means adapted to support an optical blank in a plane parallel to said independently controllable component directions, and limit control means adapted to automatically limit movement of said carriage means to a given distance in any radial direction about a predetermined position.

43. An optical surface generating apparatus according to claim 42 wherein said limit control means comprises switch means operable to deenergize said drive means in response to movement of said carriage means said given distance from said predetermined position.

44. An optical surface generating apparatus according to claim 43 wherein said limit control means comprises a flexible connector having one end fixed and another end secured to said carriage means, said connector adapted to actuate said switch means in response to movement of said carriage means for said given distance in any radial direction from said predetermined position.

45. Surface generating apparatus comprising a frame; surface modifying means for modifying the contour of the work surface of a work piece; carriage means mounted on said frame for controlling said surface modifying means; drive means for producing movement of said carriage means on said frame; support means for supporting said work piece in a plane parallel to the direction of movement of said carriage means; and, limit control means for automatically limiting the movement of said carriage means to a given distance in any radial direction about a predetermined position.

46. Surface generating apparatus according to claim 45 wherein said limit control means comprises switch means for deenergizing said drive means in response to movement of said carriage means said given distance from said predetermined position.

47. Surface generating apparatus according to claim 46 wherein said limit control means comprises a flexible connector having one end secured to said carriage means and another end releasably secured to said frame, said connector including means for actuating said switch means in response to movement of said carriage means said given distance in any radial direction from said predetermined position.

48. Surface generating apparatus according to claim 47 and further including means for adjusting the length of said flexible connector for varying the distance of movement of said carriage means from said predetermined position.